United States Patent [19]

Sikora

[11] 3,882,500
[45] May 6, 1975

[54] SYSTEM FOR THE AUTOMATIC TRACKING OF A MOVING TARGET

[75] Inventor: Harald Sikora, Bremen, Germany

[73] Assignee: U.S. Philips Corporation, New York, N.Y.

[22] Filed: Nov. 9, 1973

[21] Appl. No.: 414,532

[30] Foreign Application Priority Data
Nov. 11, 1972  Germany............................ 2255373

[52] U.S. Cl.................................... 343/7.4; 343/7.7
[51] Int. Cl............................................... G01s 9/02
[58] Field of Search............................... 343/7.4, 7.7

[56] References Cited
UNITED STATES PATENTS
3,772,696  11/1973  Kummer............................... 343/7.4
3,781,886  12/1973  Lank et al............................ 343/7.4
3,796,989  3/1974  Ravas et al. ...................... 343/7.7 X

*Primary Examiner*—T. H. Tubbesing
*Attorney, Agent, or Firm*—Frank R. Trifari; George B. Berka

[57] ABSTRACT

Pulse-modulated radar system with conical scanning and utilizing two MTI filters.

Due to the pulse modulation and the Doppler shift of the echo signals, disturbing frequency components can appear in the range of the scan frequency after coherent detection.

This disturbance is avoided by utilizing two quadrature receiver channels. The amplitude of the echo signals is determined by the vector sum of real and imaginary Doppler signal components.

3 Claims, 2 Drawing Figures

SYSTEM FOR THE AUTOMATIC TRACKING OF A MOVING TARGET

The invention relates to a system for the automatic tracking of a moving target, comprising means for radiating pulse-modulated electromagnetic energy in a rotating beam whose axis describes a cone, means for receiving and selecting electromagnetic energy reflected by a moving target, and means for deriving tracking signals from the modulation of the amplitude of the received and selected electromagnetic energy.

Pulse-modulated radar systems with conical scan for tracking a moving target of the kind set forth are known. The conical scan produces a modulation of the amplitude (scan modulation) of the electromagnetic energy reflected by a target (echo signal) with the scan frequency. The modulation depth is then dependent of the angle difference between the axis of the scan cone and the direction of the target.

The normally used method of deriving tracking signals, for tracking the target in azimuth and elevation, from the echo signal consists in the phase detection of the envelope of the echo signal, the phase reference being two quadrature components of a reference signal of scan frequency (U.S. Pat. No. 3,026,513, column 1).

In radar systems for tracking moving targets filters (MTI filters) are used in the video portion for selecting the echo signals whose frequency, due to the movement of the target, has been shifted (Doppler shift) with respect to the electromagnetic energy radiated by the radar system. The tracking signals are then derived in the described manner from the envelope of the selected echo signals.

In pulse-modulated radar systems the pulse modulation in the frequency spectrum of the radiated electromagnetic energy causes frequency components at distances amounting to an integer number of times the pulse repetition frequency from the central carrier frequency or transmission frequency. After Doppler shifting and coherent detection of the echo signal, these frequency components may give rise to signals which are situated in the range of the scan frequency, with the result that the tracking signals are disturbed and the tracking of the moving target is hampered.

The invention has for its object to provide a system of the kind set forth in which the said disturbing influencing of the accuracy at which a target can be tracked is avoided.

The system according to the invention is characterized in that the means for receiving and selecting the electromagnetic energy reflected by a moving target comprise two selective receive channels for coherent detection at a 90° phase difference of the received electromagnetic energy, each of the two selective receive channels being provided with means for selecting the received electromagnetic energy whose frequency differs due to the Doppler shifting from that of the radiated electromagnetic energy, the two selective receive channels being connected to means for determining the amplitude of the detected signals, the said amplitude corresponding to a complex signal $Z = \sqrt{R^2 + I^2}$, where R = real component and I = imaginary components of the Doppler frequency.

The invention will be described in detail hereinafter with reference to the Figures.

Figure 1:
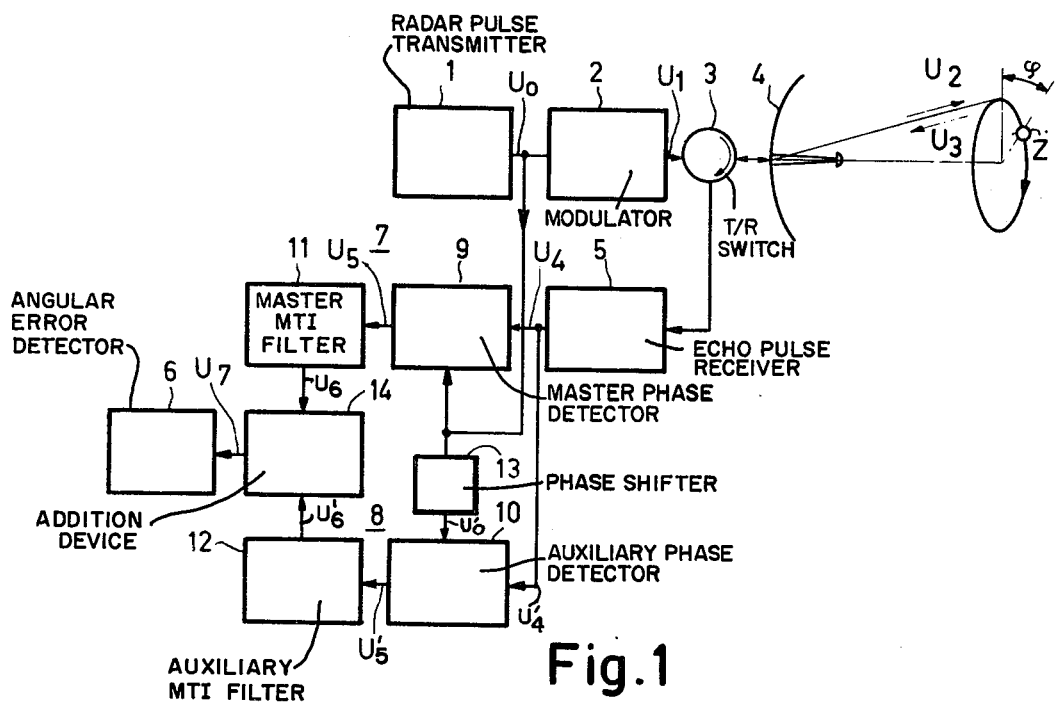
FIG. 1 shows the block diagram of a system according to the invention.

The radar system shown in FIG. 1 comprises a transmitter oscillator 1 which is coupled to a pulse modulator 2 which is coupled, via a transmit receive switch 3, to the antenna 4. The antenna 4 has a small beam width and is provided with means for rotating the beam such that the axis of the beam describes a cone.

In the receiving device the aerial 4 is coupled to a receiver 5 via switch 3. In the angular error detecting device 6, which may be constructed as described in U.S. Pat. No. 3,026,513, the tracking signals for azimuth and elevation are derived from the envelope of the echo signal.

According to the invention, the output of receiver 5 is coupled to two quadrature receive channels 7 and 8 for coherent detection at a 90° phase difference of the echo signals. Each of the receive channels 7, 8 comprises a master phase detector 9, an auxiliary phase detector 10 and MTI filters 11, 12.

The reference voltage $U_0$ for phase detector 9 is directly supplied by the transmitter 1, and the phase detector 10 is supplied by the transmitter oscillator 1 via a 90° phase-shifting network 13.

The output of filters 11 and 12 representing, respectively, real and imaginary components of Doppler echo signals of moving targets are applied to an adding device 14 for determining the amplitude Z corresponding to $R^2 = I^2$, where R = real component and I = imaginary component of the detected Doppler; echo signals. The amplitude Z is independent from the time behavior of the Doppler echo signals.

Figure 2:
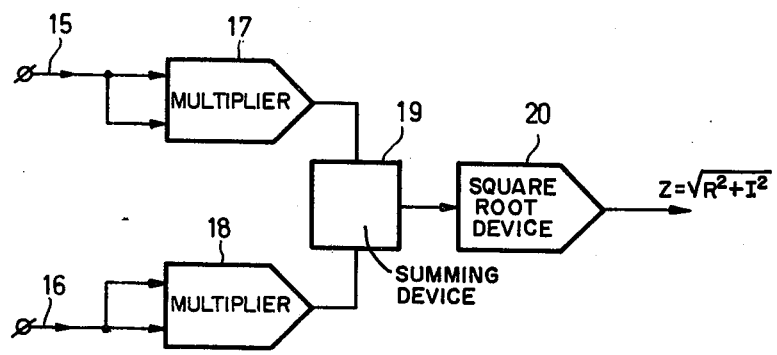
FIG. 2 shows the block diagram of a device for determining the amplitude.

The block diagram of the device 14 is shown in FIG. 2. Each of the inputs 15 and 16 is coupled to the two inputs of a multiplication stage 17, 18. These stages quadrate the input signals. The output signals of the stages 17 and 18 are summed in the summing device 19, and the output signal thereof is applied to a square root device 20 for forming the root of the supplied signal.

The signals applied to the inputs 15 and 16 are the quadrature components of the echo signal, with the result that the signal which is formed on the output of device 20 represents the amplitude of the echo signal. This amplitude is still modulated with the scan frequency and device 6 derives the tracking signals from this modulation.

The undesired modulation products resulting from mixing Doppler shift frequency of the echo signals with echo pulses are no longer present in the output signal of device 14, with the result that no disturbing frequency components can occur in the range of the scan frequency on the output of device 14, so that adverse influencing of the accuracy at which a target can be tracked is avoided, The foregoing will be mathematically illustrated. For this purpose, first a few signals will be defined.

The signal $U_0$ of transmitter oscillator 1 is represented by:

$$U_0 = \hat{U}_0 \cos \Omega \, t$$

The scan modulation is represented by the factor:

$$1 + m \cos(\omega_s t + \phi)$$

The pulse modulation of pulse modulator 1 is represented by the time function $g(t)$.

The propagation time of the electromagnetic waves to the target is represented by T. The Doppler shift frequency is represented by $\omega_d$. For the sake of simplicity, the effect of the propagation time on the scan modulation is ignored, which is permissible for the relevant low scan frequencies.

The following can then be written for the output signal $U_1$ of pulse modulator 1:

$$U_1 = \hat{U}_1\, g(t)\, \cos \omega t$$

The following can be written for the signal $U_2$ which is incident on the target $z$:

$$U_2 = \hat{U}_2\, g(t-T)\, (1 + m \cos (\omega_s t + \phi))\, \cos \Omega\, (t-T)$$

The following can be written for the signal $U_3$ which is reflected by the (moving) target:

$$U_3 = \hat{U}_3\, g(t-T)\, (1+m \cos (\omega_s t + \phi))\, \cos (\Omega + \omega_d)\,(t-T).$$

Another scan modulation occurs upon reception of the echo signal, with the result that the following can be written for the output signal $U_4$ of receiver 5:

$$U_4 = \hat{U}_4\, g(t-2T)\, (1+m \cos (\omega_s t + \phi))^2\, \cos (\Omega + \omega_d)\,(t-2T)$$

After coherent detection in the receiver channels 7 and 8, the signals $U_5$ and $U_6$ are produced:

$$U_5 = \hat{U}_5\, g(t-2T)\, (1+m \cos (\omega_s t+\phi))^2\, \cos \omega_d(t-2T)$$

$$U_6 = \hat{U}_6\, g(t-2T)\, (1+m \cos (\omega_s t+\phi))^2\, \sin \omega_d(t-2T),$$

where $\hat{U}_5 = \hat{U}_6$.

The product of the factors $g(t-2T)$ and $\cos \omega_d(t-2T)$ may give rise to frequency components in the range of the scan frequency.

However, if the signals $U_5$ and $U_6$ are processed in the device 14 in the described manner, the signal $U_7$ is produced on the output thereof:

$$U_7 = \hat{U}_7\, g(t-2T)\, (1+m \cos ( \omega_s t + \phi))^2,$$

in which the Doppler shift frequency $\omega_d$ no longer occurs, so that disturbing frequency components cannot occur in the signal $U_7$.

The accuracy at which a target can be tracked with the described radar system, utilizing MTI filters and two quadrature receive channels, is comparable to that of radar systems without MTI filters in as far as the strength of the echo signals is the same in both cases.

It is to be noted that even though in FIG. 1 the reference signal for the receive channels 7 and 8 is derived from the transmitter oscillator 1, the reference signal could alternatively be derived from a separate oscillator which is synchronized with the transmitter oscillator. Furthermore, the reference signal need not have the same frequency as the transmitter oscillator. The receiver 5, having no other function in the described radar system than to couple the switch 3 to the channels 7 and 8, could effect a conversion of the echo signal to an intermediate frequency, in which case the frequency of the reference signal for the channels 7 and 8 would have to be equal to the intermediate frequency.

What is claimed is:

1. A radar system for tracking a moving target comprising means for transmitting pulse-modulated electromagnetic energy in a rotating beam whose axis describes a cone, means for receiving electromagnetic energy reflected by a moving target, a first phase detector connected to the receiving means and supplied by a first reference signal from the transmitting means to compare the phase of the reflected signal with the transmitted signal, first frequency selecting means connected to the first phase detector to pass-through the real signals whose frequency differs due to Doppler shifting from that of the transmitted electromagnetic energy, a second phase detector connected to the receiving means and supplied by a second reference signal which is phase shifted about 90° with respect to the first reference signal, second frequency selecting means connected to the second phase detector to pass-through the imaginary Doppler signal components, vector adding means connected to the first and second filter means for adding the real and imaginary Doppler signal components, and tracking error detecting means connected to the output of the said adding means.

2. A system as claimed in claim 1, wherein said vector adding means comprises a first multiplier stage for squaring the real Doppler signal, a second multiplier stage for squaring the imaginary Doppler signal component, a summing device for adding the outputs from said multiplier stage and a square root device for providing a square root from the output of the summing device.

3. A system as claimed in claim 1, wherein said frequency selecting means are MTI filters.

* * * * *

UNITED STATES PATENT OFFICE
CERTIFICATE OF CORRECTION

Patent No. 3,882,500    Dated May 6, 1975

Inventor(s) HARLD SIKORA

It is certified that error appears in the above-identified patent and that said Letters Patent are hereby corrected as shown below:

On the title page Section [30] change "2255373" to

--P.2255 373.7--.

Column 2, line 30, change "$R^2 = I^2$" to

--$\sqrt{R^2 + I^2}$--.

Column 3, line 10, change "$\cos \omega t$" to --$\cos \Omega t$--.

Signed and Sealed this fifth Day of August 1975

[SEAL]

Attest:

RUTH C. MASON
Attesting Officer

C. MARSHALL DANN
Commissioner of Patents and Trademarks